US006382004B1

(12) United States Patent  
Jameel

(10) Patent No.: US 6,382,004 B1  
(45) Date of Patent: May 7, 2002

(54) ANTI-THEFT DEVICE FOR MOTOR VEHICLES

(76) Inventor: Nazar Jameel, 8925 Robin Dr. Unit E, Des Plaines, IL (US) 60016

( * ) Notice: Subject to any disclaimer, the term of this patent is extended or adjusted under 35 U.S.C. 154(b) by 0 days.

(21) Appl. No.: 09/621,988

(22) Filed: Jul. 21, 2000

(51) Int. Cl.[7] .......................... E05B 27/00; B60R 25/02
(52) U.S. Cl. ........................ 70/252; 70/105; 70/186; 74/422
(58) Field of Search ....................... 70/182, 183, 184, 70/185, 186, 252, 218, 222, 223; 74/422, 498; 180/426, 427, 428

(56) References Cited

U.S. PATENT DOCUMENTS

| 3,575,023 A | * | 4/1971 | Shimizu ...................... 70/252 |
| 4,309,882 A | * | 1/1982 | Maiocco ...................... 70/186 |
| 4,606,426 A | | 8/1986 | De La Orden Azuaga .. 180/287 |
| 4,798,067 A | * | 1/1989 | Peitsmeier et al. ........... 70/252 |
| 4,811,580 A | | 3/1989 | Jang ............................. 70/218 |
| 4,907,427 A | * | 3/1990 | Armstrong ................... 70/252 |
| 4,924,685 A | | 5/1990 | Usina ........................... 70/218 |
| 5,345,797 A | | 9/1994 | Hayes .......................... 70/218 |
| 5,660,078 A | * | 8/1997 | Phillips ....................... 74/422 |
| 5,689,983 A | * | 11/1997 | McCoolidge ................ 70/252 |
| 5,735,151 A | | 4/1998 | Nickeas et al. ............... 70/221 |
| 5,823,024 A | | 10/1998 | Goodson et al. .............. 70/218 |

* cited by examiner

Primary Examiner—Tan Nguyen  
Assistant Examiner—Dalena Tran

(57) ABSTRACT

An anti-theft device for motor vehicles for disengaging the steering wheel from the steering column when the ignition lock is in the locked position. The anti-theft device for motor vehicles includes a shaft. A first end of the shaft is adapted for securely attaching to a steering wheel. A boss is integrally coupled to a second end of the shaft. A well extends into the boss. A rod, having top and bottom ends, is mounted in the well. A biasing means biases the top end of the rod out of the well. A saddle member, integrally coupled to a free end of a steering column, is adapted for receiving the boss. The saddle member has a hole therethrough. The hole is generally located such that the top end of the rod may extend through the hole. A protruding member is mounted to a housing containing the boss and saddle member. The protruding member has a lumen therein. A pin is positioned in the lumen and has a first end and a second end. The first end is extendable into the hole in the saddle member. An ignition lock engaging member is integrally coupled to the second end of the pin. An urging means urges the first end of the pin into the hole in the saddle member. The ignition lock is securely mounted to the protruding member and mechanically coupled to the ignition lock engaging member.

12 Claims, 3 Drawing Sheets

US 6,382,004 B1

ANTI-THEFT DEVICE FOR MOTOR VEHICLES

BACKGROUND OF THE INVENTION

1. Field of the Invention

The present invention relates to vehicle anti-theft devices and more particularly pertains to a new anti-theft device for motor vehicles for disengaging the steering wheel from the steering column when the ignition lock is in the locked position.

2. Description of the Prior Art

The use of vehicle anti-theft devices is known in the prior art. More specifically, vehicle anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,606,426; 5,345,797; 5,735,151; 5,823,024; 4,811,580; 5,992,191; 4,924,685; 5,555,753; 4,935,047; 3,753,361; 3,462,982; 3,138,036; and U.S. Des. Pat. No. 371,503.

While these devices fulfill their respective, particular objectives and requirements, the aforementioned patents do not disclose a new anti-theft device for motor vehicles. The inventive device includes a shaft. A first end of the shaft is adapted for securely attaching to a steering wheel. A boss is integrally coupled to a second end of the shaft. A well extends into the boss. A rod, having top and bottom ends, is mounted in the well. A biasing means biases the top end of the rod out of the well. A saddle member, integrally coupled to a free end of a steering column is adapted for receiving the boss. The saddle member has a hole therethrough. The hole is generally located such that the top end of the rod may extend through the hole. A housing has a proximal end, a distal end and peripheral wall extending therebetween. The distal and proximal ends have openings therein. The saddle member and the boss are positioned in the housing. A protruding member is coupled to and extends away from the peripheral wall. The protruding member has a lumen therein. The peripheral wall has a hole therein extending into the lumen. The hole in the peripheral wall of the housing is opposed to the hole in the saddle member. A pin is positioned in the lumen. The pin has a first end and a second end. The first end is positioned in the hole in the peripheral wall of the housing. An ignition lock engaging member is integrally coupled to the second end of the pin. An urging means urges the first end of the pin into the hole in the saddle member. The ignition lock is securely mounted to the protruding member and mechanically coupled to the ignition lock engaging member.

In these respects, the anti-theft device for motor vehicles according to the present invention substantially departs from the conventional concepts and designs of the prior art, and in so doing provides an apparatus primarily developed for the purpose of disengaging the steering wheel from the steering column when the ignition lock is in the locked position.

SUMMARY OF THE INVENTION

In view of the foregoing disadvantages inherent in the known types of vehicle anti-theft devices now present in the prior art, the present invention provides a new anti-theft device for motor vehicles construction wherein the same can be utilized for disengaging the steering wheel from the steering column when the ignition lock is in the locked position.

The general purpose of the present invention, which will be described subsequently in greater detail, is to provide a new anti-theft device for motor vehicles apparatus and method which has many of the advantages of the vehicle anti-theft devices mentioned heretofore and many novel features that result in a new anti-theft device for motor vehicles which is not anticipated, rendered obvious, suggested, or even implied by any of the prior art vehicle anti-theft devices, either alone or in any combination thereof.

To attain this, the present invention generally comprises a shaft. A first end of the shaft is adapted for securely attaching to a steering wheel. A boss is integrally coupled to a second end of the shaft. A well extends into the boss. A rod, having top and bottom ends, is mounted in the well. A biasing means biases the top end of the rod out of the well. A saddle member, integrally coupled to a free end of a steering column is adapted for receiving the boss. The saddle member has a hole therethrough. The hole is generally located such that the top end of the rod may extend through the hole. A housing has a proximal end, a distal end and peripheral wall extending therebetween. The distal and proximal ends have openings therein. The saddle member and the boss are positioned in the housing. A protruding member is coupled to and extends away from the peripheral wall. The protruding member has a lumen therein. The peripheral wall has a hole therein extending into the lumen. The hole in the peripheral wall of the housing is opposed to the hole in the saddle member. A pin is positioned in the lumen. The pin has a first end and a second end. The first end is positioned in the hole in the peripheral wall of the housing. An ignition lock engaging member is integrally coupled to the second end of the pin. An urging means urges the first end of the pin into the hole in the saddle member. The ignition lock is securely mounted to the protruding member and mechanically coupled to the ignition lock engaging member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft device for motor vehicles apparatus and method which has many of the advantages of the vehicle anti-theft devices mentioned heretofore and many novel features that result in a new anti-theft device for motor vehicles which is not anticipated, rendered obvious, suggested, or even implied by any of the prior art vehicle anti-theft devices, either alone or in any combination thereof.

It is another object of the present invention to provide a new anti-theft device for motor vehicles which may be easily and efficiently manufactured and marketed.

It is a further object of the present invention to provide a new anti-theft device for motor vehicles which is of a durable and reliable construction.

An even further object of the present invention is to provide a new anti-theft device for motor vehicles which is susceptible of a low cost of manufacture with regard to both materials and labor, and which accordingly is then susceptible of low prices of sale to the consuming public, thereby making such anti-theft device for motor vehicles economically available to the buying public.

Still yet another object of the present invention is to provide a new anti-theft device for motor vehicles which provides in the apparatuses and methods of the prior art some of the advantages thereof, while simultaneously overcoming some of the disadvantages normally associated therewith.

Still another object of the present invention is to provide a new anti-theft device for motor vehicles for disengaging the steering wheel from the steering column when the ignition lock is in the locked position.

Yet another object of the present invention is to provide a new anti-theft device for motor vehicles which includes a shaft. A first end of the shaft is adapted for securely attaching to a steering wheel. A boss is integrally coupled to a second end of the shaft. A well extends into the boss. A rod, having top and bottom ends, is mounted in the well. A biasing means biases the top end of the rod out of the well. A saddle member, integrally coupled to a free end of a steering column is adapted for receiving the boss. The saddle member has a hole therethrough. The hole is generally located such that the top end of the rod may extend through the hole. A housing has a proximal end, a distal end and peripheral wall extending therebetween. The distal-and proximal ends have openings therein. The saddle member and the boss are positioned in the housing. A protruding member is coupled to and extends away from the peripheral wall. The protruding member has a lumen therein. The peripheral wall has a hole therein extending into the lumen. The hole in the peripheral wall of the housing is opposed to the hole in the saddle member. A pin is positioned in the lumen. The pin has a first end and a second end. The first end is positioned in the hole in the peripheral wall of the housing. An ignition lock engaging member is integrally coupled to the second end of the pin. An urging means urges the first end of the pin into the hole in the saddle member. The ignition lock is securely mounted to the protruding member and mechanically coupled to the ignition lock engaging member.

Still yet another object of the present invention is to provide a new anti-theft device for motor vehicles that allows the steering wheel to rotate freely with respect to the steering column when the ignition lock in a locked position such that a potential thief may not drive the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
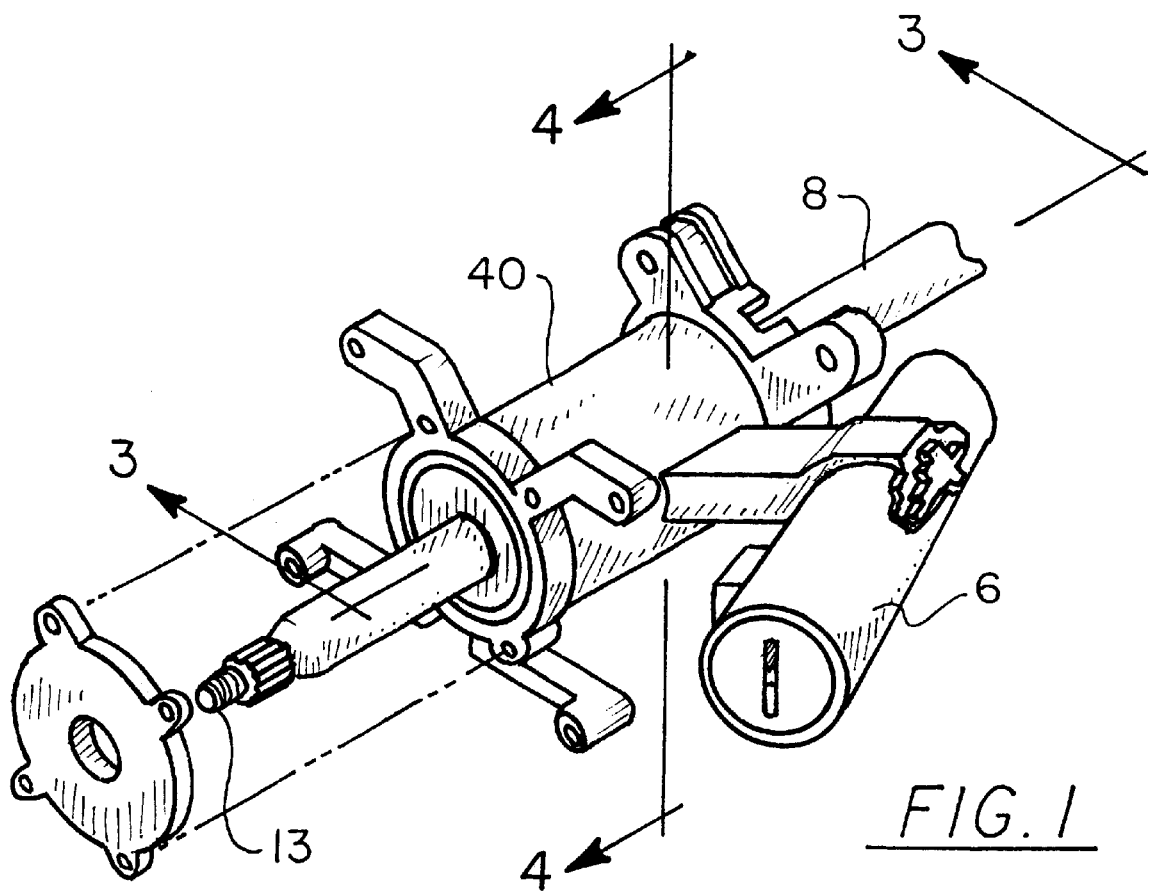
FIG. 1 is a schematic perspective view of a new anti-theft device for motor vehicles according to the present invention.
Figure 2:
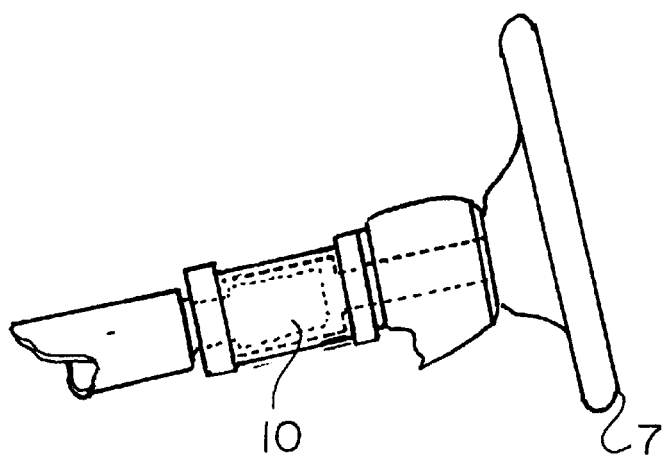
FIG. 2 is a schematic side in-use view of the present invention.
Figure 3:
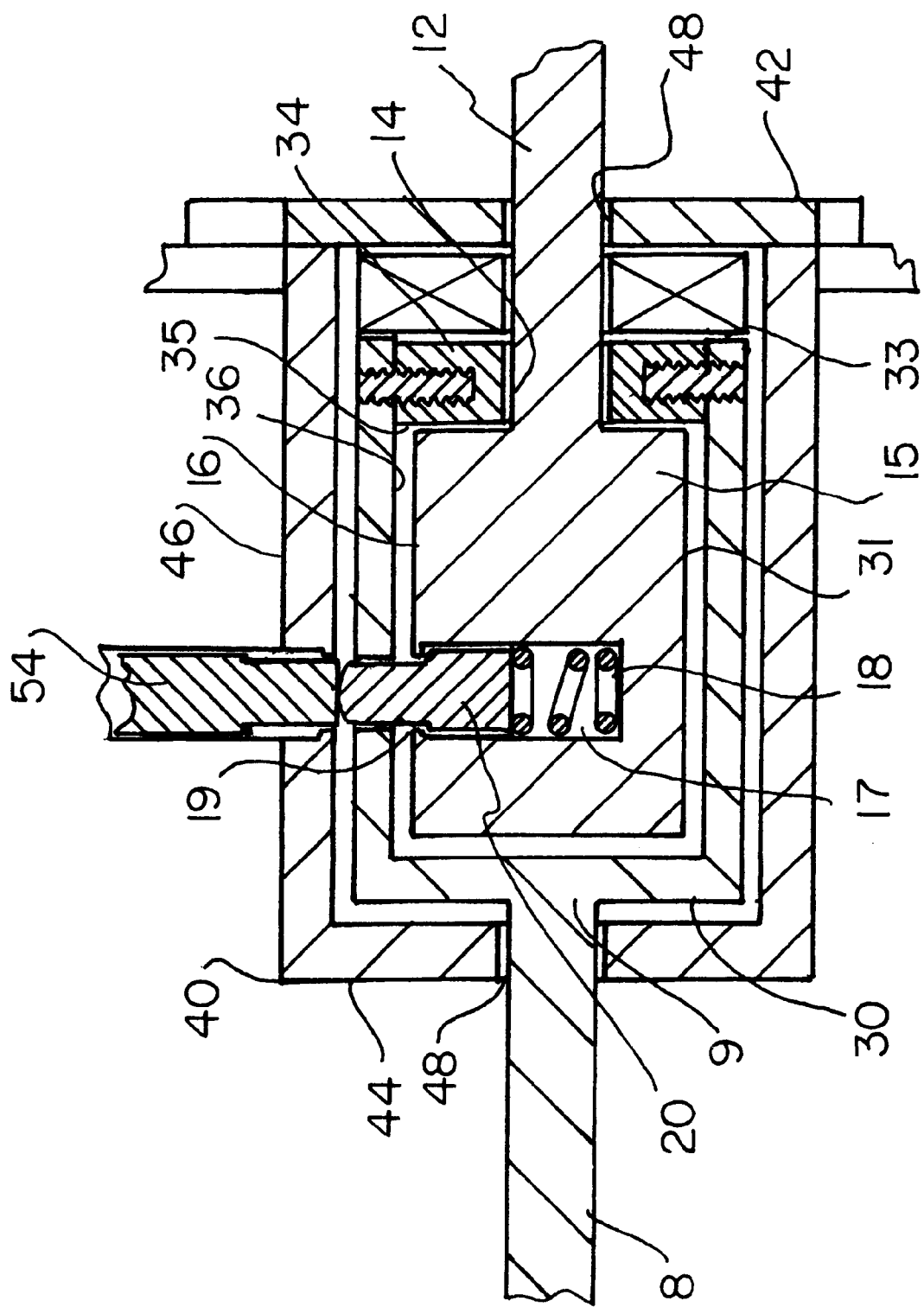
FIG. 3 is a schematic cross-sectional view taken along line 3—3 of the present invention.
Figure 4:
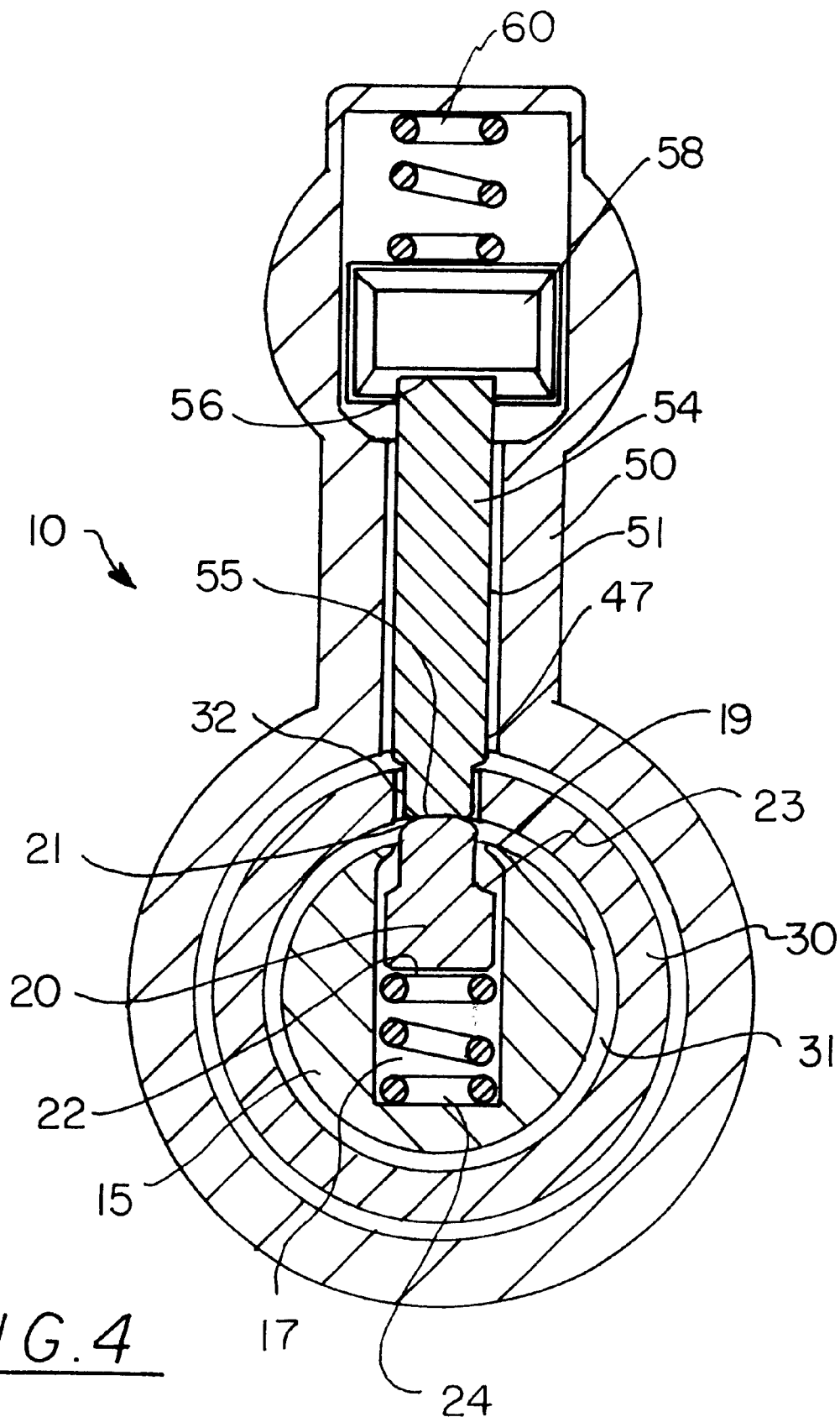
FIG. 4 is a schematic cross-sectional view taken along line 4—4 of the present invention.

With reference now to the drawings, and in particular to FIGS. 1 through 4 thereof, a new anti-theft device for motor vehicles embodying the principles and concepts of the present invention and generally designated by the reference numeral 10 will the described.

As best illustrated in FIGS. 1 through 4, the anti-theft device for motor vehicles 10 generally comprises an anti-theft device that is mechanically coupled to an ignition lock 6. A key placed into the ignition lock 6 actuates the device 10, which selectively disables the mechanical connection between a steering wheel 7 and the steering column 8 of the vehicle.

The device includes a shaft 12. The shaft 12 has a first end 13 and a second end 14. The first end 13 is adapted for securely attaching to the steering wheel 7.

A boss 15 is integrally coupled to the second end 14 of the shaft 12. The boss 15 has a perimeter wall 16 having well 17 extending therein. The well 17 is orientated generally perpendicular to a longitudinal axis of the shaft 12. The well 17 has a bottom wall 18. The well 17 has a top edge 18 having a flange 19 integrally coupled thereto and extending toward an axis of the well 17. The boss 15 preferably has a cylindrical shape such that the boss 15 has a longitudinal axis orientated generally perpendicular to the longitudinal axis of the shaft 12.

A rod 20 is mounted in the well 17. The rod 20 has a top end 21 and a bottom end 22. The rod 20 has a shoulder 23. The shoulder 23 is generally positioned between the top 21 and bottom 22 ends. The shoulder 23 is abuttable against the flange 19. The top end 21 of the rod 20 may extend outwardly beyond the peripheral wall 16 of the boss 15. The top end 21 of the rod 20 is preferably convex.

A biasing means 24 biases the shoulder 23 toward the flange 19. The biasing means 24 is positioned between the bottom wall 17 of the well 17 and the bottom end 22 of the rod 20. The biasing means 24 preferably comprises a spring.

A saddle member 30 is adapted for receiving the boss 15. The saddle member 30 is integrally coupled to a free end 9 of the steering column 8 and positioned such that the boss 15 is positioned in a bore 31 in the saddle member 30. The boss 15 may rotate with respect to the saddle member 30. The saddle member 30 has a hole 32 therethrough. The hole 32 extends into the bore 31. The hole 32 is generally located such that the top end 21 of the rod 20 may extend through the hole 32 to couple the boss 15 to the saddle member 30. The saddle member 30 preferably has a cylindrical shape. The saddle member 30 has a free edge 33 extending beyond the second end 14 of the shaft 12 such that the boss 15 is located within the saddle member 30.

The shaft 12 extends though a ring member 34, such that the ring member 34 is rotatably mounted on the shaft 12. The ring member 34 has a perimeter edge 35 securely attached to an interior surface 36 of the saddle member 30 and positioned generally adjacent to the free edge 33 of the saddle member 30.

A housing 40 has a proximal end 42, a distal end 44 and peripheral wall 46 extending therebetween. The distal 44 and proximal 42 ends each have an opening 48 therein. The shaft 12 extends through the opening in the peripheral end 42, and the steering column 8 extends through the opening 48 in the proximal end 42. A protruding member 50 is coupled to and extends away from the peripheral wall 46. The protruding member 50 has a lumen 51 therein. The peripheral wall 46 has a hole 47 therein extending into the lumen 51. The hole 47 in the peripheral wall 46 of the housing 40 is opposed to the hole 32 in the saddle member 30.

A pin 54 is positioned in the lumen 51. The pin 54 has a first end 55 and a second end 56. The first end 55 is positioned in the hole 47 in the peripheral wall 46 of the housing 40. An ignition lock engaging member 58 is integrally coupled to the second end 56 of the pin 54.

An urging means 60 urges the first end 55 of the pin 54 into the hole 32 in the saddle member 30. The urging means 60 is positioned in the lumen 51 and abutted against the ignition lock engaging member 58. The urging means 60 comprises a spring.

In use, the ignition lock 6 is securely mounted to the protruding member 50 and mechanically coupled to the ignition lock engaging member 58. The ignition lock 6 is a conventional ignition lock 6 such that the ignition lock engaging member 58 acts like the other key engaging members found within a lock 6. Placing the key in the lock 6 and unlocking the ignition lock 6 pulls the second end 56 of the pin 54 away from the saddle member 30 such that the rod 20 may enter the hole 32 in the saddle member 30 and enable a connection between the shaft 12 and the steering column 8. When the key is turned to the lock position, the first end 55 of the in 54 pushes the rod 20 out of the hole 32 in the saddle member 30 so that the shaft 12 may turn freely with respect to the steering column 8.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft device for a vehicle, said device being mechanically coupled to an ignition lock, wherein a key placed into the ignition lock actuates said device, said device selectively disabling the mechanical connection between a steering wheel and the steering column of the vehicle, said device comprising:

a shaft having a first end and a second end, said first end being adapted for securely attaching to the steering wheel;

a boss being integrally coupled to said second end of said shaft, said boss having a perimeter wall having a well extending therein, said well being orientated generally perpendicular to a longitudinal axis of said shaft, said well having a bottom wall, said well having a top edge having a flange integrally coupled thereto and extending toward an axis of said well, said boss having a generally cylindrical shape such that said boss has a longitudinal axis orientated generally perpendicular to said longitudinal axis of said shaft;

a rod being mounted in said well and having a top end and a bottom end, said rod having a shoulder, said shoulder being generally positioned between said top and bottom ends, said shoulder being abuttable against said flange, wherein said top end of said rod may extend outwardly beyond said peripheral wall of said boss, said top end of said rod being convex;

a biasing means for biasing said shoulder toward said flange being positioned between said bottom wall of said well and said bottom end of said rod, said biasing means comprising a spring;

a saddle member adapted for receiving said boss being integrally coupled to a free end of the steering column and positioned such that said boss is positioned in a bore in said saddle member, wherein said boss may rotate with respect to said saddle member, said saddle member having a hole therethrough, said hole extending into said bore, said hole being generally located such that said top end of said rod may extend through said hole, said saddle member having a generally cylindrical shape, said saddle member having a free edge extending beyond said second end of said shaft such that said boss is located within said saddle member;

a ring member, said shaft extending though said ring member, such that said ring member is rotatably mounted on said shaft, said ring member having a perimeter edge securely attached to an interior surface of said saddle member and positioned generally adjacent to said free edge of said saddle member;

a housing having a proximal end, a distal end and peripheral wall extending therebetween, said distal and proximal ends having openings therein, said shaft extending through said opening in said peripheral end, said steering column extending through said opening in said proximal end, a protruding member being coupled to and extending away from said peripheral wall, said protruding member having a lumen therein, said peripheral wall having a hole therein extending into said lumen, said hole in said peripheral wall of said housing being opposed to said hole in said saddle member;

a pin being positioned in said lumen, said pin having a first end and a second end, said first end being positioned in said hole in said peripheral wall of said housing, an ignition lock engaging member being integrally coupled to said second end of said pin;

an urging means for urging said first end of said pin into said hole in said saddle member being positioned in said lumen and abutted against said ignition lock engaging member, said urging means comprising a spring; and wherein said ignition lock is securely mounted to said protruding member and mechanically coupled to said ignition lock engaging member, wherein placing said key in said device and unlocking said ignition lock pulls said second end of said pin away from said saddle member such that said rod may enter said hole in said saddle member and enable a connection between said shaft and said steering column.

2. An anti-theft device for a vehicle comprising:

a steering column of a vehicle;

an ignition lock being selectively actuated by a key placed into said ignition lock, said ignition lock being mechanically coupled to said steering column;

a steering wheel being mounted on said steering column of said vehicle;

a shaft having a first end and a second end, said first end being adapted for attaching to the steering wheel;

a boss being coupled to said second end of said shaft, said boss having a perimeter wall with a well extending therein;

a rod being mounted in said well, said rod having a top end and a bottom end;

a biasing means for biasing said top end of said rod out of said well;

a saddle member adapted for receiving said boss, said saddle member being coupled to a free end of the steering column and positioned such that said boss is positioned in a bore in said saddle member, said saddle member having a hole extending therethrough and into said bore, said hole being positioned such that said top end of said rod is extendable through said hole;

a housing having a proximal end, a distal end and peripheral wall extending therebetween, said distal and proximal ends having openings therein, said saddle member and said boss being positioned in said housing, a protruding member being coupled to and extending away from said peripheral wall, said protruding member having a lumen therein, said peripheral wall having a hole therein extending into said lumen, said hole in said peripheral wall of said housing being opposed to said hole in said saddle member;

a pin being positioned in said lumen, said pin having a first end and a second end, said first end being positioned in said hole in said peripheral wall of said housing;

an ignition lock engaging member being coupled to said second end of said pin;

an urging means for urging said first end of said pin into said hole in said saddle member; and wherein said ignition lock is mounted to said protruding member and coupled to said ignition lock engaging member, wherein placing said key in said device and unlocking said ignition lock pulls said second end of said pin away from said saddle member such that said rod may enter said hole in said saddle member and enable a connection between said shaft and said steering column.

3. An anti-theft device for a vehicle, said device being mechanically coupled to an ignition lock, wherein a key placed into the ignition lock actuates said device, said device selectively disabling the mechanical connection between a steering wheel and the steering column of the vehicle, said device comprising:

a shaft having a first end and a second end, said first end being adapted for attaching to the steering wheel;

a boss being integrally coupled to said second end of said shaft, said boss having a perimeter wall having a well extending therein, said well being orientated generally perpendicular to a longitudinal axis of said shaft, said well having a bottom wall and a top edge having a flange integrally coupled thereto and extending toward an axis of said well;

a rod being mounted in said well, said rod having a top end and a bottom end, said rod having a shoulder, said shoulder being generally positioned between said top and bottom ends, said shoulder being abuttable against said flange, wherein said top end of said rod may extend outwardly beyond said peripheral wall of said boss;

a biasing means for biasing said shoulder toward said flange;

a saddle member adapted for receiving said boss, said saddle member being coupled to a free end of the steering column and positioned such that said boss is positioned in a bore in said saddle member, wherein said boss may rotate with respect to said saddle member, said saddle member having a hole extending therethrough and into said bore, said hole being positioned such that said top end of said rod may extend through said hole, said saddle member having a free edge extending beyond said second end of said shaft such that said boss is located within said saddle member;

a housing having a proximal end, a distal end and peripheral wall extending therebetween, said distal and proximal ends having openings therein, said shaft extending through said opening in said peripheral end, said steering column extending through said opening in said proximal end, a protruding member being coupled to and extending away from said peripheral wall, said protruding member having a lumen therein, said peripheral wall having a hole therein extending into said lumen, said hole in said peripheral wall of said housing being opposed to said hole in said saddle member;

a pin being positioned in said lumen, said pin having a first end and a second end, said first end being positioned in said hole in said peripheral wall of said housing;

an ignition lock engaging member being coupled to said second end of said pin;

an urging means for urging said first end of said pin into said hole in said saddle member; and wherein said ignition lock is mounted to said protruding member and coupled to said ignition lock engaging member, wherein placing said key in said device and unlocking said ignition lock pulls said second end of said pin away from said saddle member such that said rod may enter said hole in said saddle member and enable a connection between said shaft and said steering column.

4. The anti-theft device for a vehicle as in claim 3, wherein said boss has a generally cylindrical shape and a longitudinal axis orientated generally perpendicular to said longitudinal axis of said shaft.

5. The anti-theft device for a vehicle as in claim 4, wherein said top end of said rod is convex.

6. The anti-theft device for a vehicle as in claim 5, wherein said biasing means is positioned between said bottom wall of said well and said bottom end of said rod, said biasing means comprising a spring.

7. The anti-theft device for a vehicle as in claim 6, further including a ring member, said shaft extending though said ring member such that said ring member is rotatably mounted on said shaft, said ring member having a perimeter edge securely attached to an interior surface of said saddle member and positioned generally adjacent to said free edge of said saddle member.

8. The anti-theft device for a vehicle as in claim 7, wherein said urging means comprising a spring positioned in said lumen and abutted against said ignition lock engaging member.

9. The anti-theft device for a vehicle as in claim 5, wherein said biasing means comprises a spring positioned between said bottom wall of said well and said bottom end of said rod.

10. The anti-theft device for a vehicle as in claim 3, wherein said top end of said rod is convex.

11. The anti-theft device for a vehicle as in claim 3, further including a ring member, said shaft extending though said ring member such that said ring member is rotatably mounted on said shaft, said ring member having a perimeter edge attached to an interior surface of said saddle member and positioned generally adjacent to said free edge of said saddle member.

12. The anti-theft device for a vehicle as in claim 3, wherein said urging means comprising a spring positioned in said lumen and abutted against said ignition lock engaging member, said urging means comprising a spring.

\* \* \* \* \*